Aug. 13, 1946.  L. WINSTON  2,405,920
CONVEYING APPARATUS
Filed June 19, 1944  2 Sheets-Sheet 1

Love Winston
INVENTOR.

BY *Milo B. Stevens & Co.*

Attorneys.

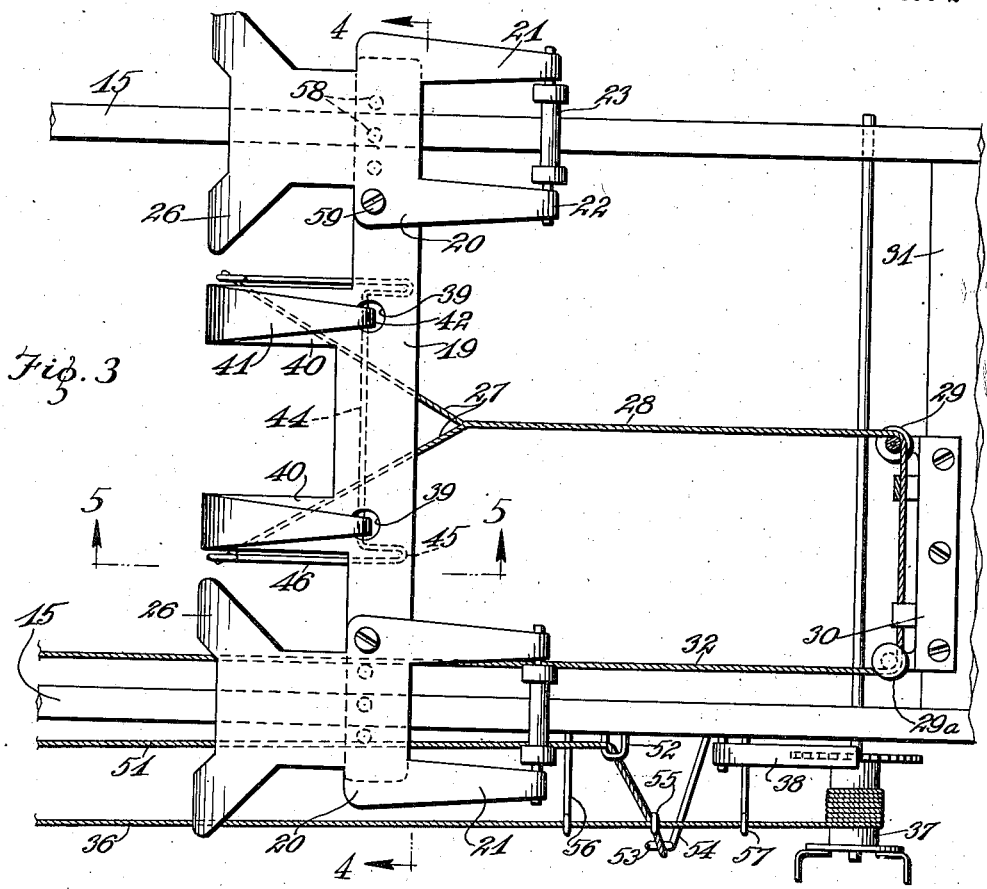

Patented Aug. 13, 1946

2,405,920

UNITED STATES PATENT OFFICE 2,405,920

CONVEYING APPARATUS

Love Winston, Chicago, Ill.

Application June 19, 1944, Serial No. 541,053

12 Claims. (Cl. 198—20)

My invention relates to conveyors, and is intended for use on the outside of steel plants for moving steel bars to loading zones. The bars under consideration run in lengths of 10 to 60 feet and come in rectangular, I-beam, angle-bar, and other cross-sections. They issue from the mill lengthwise over rollers to points in the rear of the transfer zone. Here the bars are pulled crosswise off the rollers onto a series of tracks which lead forward to the inspection zone for removal.

Since the steel bars are irregular in cross-section and roughly surfaced, they must be pulled rather than rolled on the tracks to the inspection zone. As the bars are heavy and require four or more men to pull them their progress is eased by frequently oiling the tracks. This means an expenditure for labor and oil, and at best is a hard and tedious job, since the bars encounter considerable friction despite frequent efforts to ease their progress. Besides, the oil makes the handling of the bars and the surrounding area messy and the task a disagreeable one.

In view of the above conditions, the main object of the present invention is to provide handy conveyor means for the transfer of the work from the original rollers to the inspection zone.

A further object of the invention is to provide a conveyor in the form of a carriage employing the tracks of the transfer course to convey the work to the inspection zone.

Another object of the invention is to provide means for limiting the travel of the carriage to desired points along the course of its travel.

A still further object of the invention is to include means for facilitating the discharge of the load from the carriage when the destination of the transfer has been reached.

An important object of the invention is to employ means in the novel conveying apparatus which are simple in design, convenient to handle and conducive to a considerable saving of labor, manual effort and maintenance costs.

With the above objects in view and any others which may suggest themselves from the description to follow, a better understanding of the invention may be had by reference to the accompanying drawings, in which—

Figure 1:
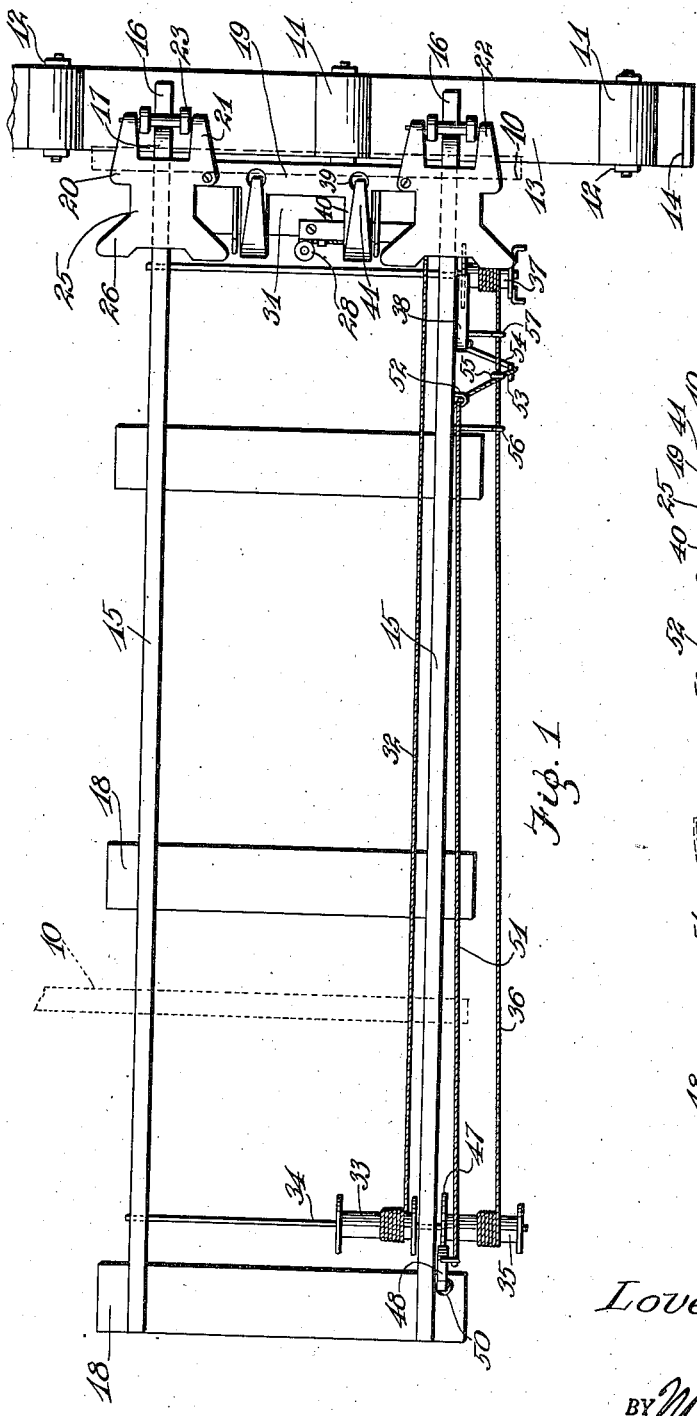
Fig. 1 is a top plan view of the novel conveying apparatus.

Fig. 3 is an enlarged portion of Fig. 1, showing the carriage partly on its way; and Figs. 4 and 5 are, respectively, sections on the lines 4—4 and 5—5 of Fig. 3.

Referring specifically to the drawings, 10 denotes one of the steel bars resting on the original supporting rollers 11. These are freely journaled in standards 12 rising from a platform 13 and extend in a sufficient series to accommodate the longest bars receivable, the platform having a terminal bumper 14 to stop the bars. The tracks 15 extend laterally of the bars in pairs, as indicated in Fig. 1; and they commence with base pieces 16 with curves 17 rising to the regular level of the tracks, which are supported on ties 18. One set of tracks is shown and is suitable for short bars. However, two sets are usually erected, to accommodate the longer bars as well.

The carriage previously mentioned is indicated at 19 and comprises a heavy plate extending crosswise of the track unit. The end portions of the plate carry side members 20 of identical construction over the respective tracks 15. Each side member is formed rearwardly as a fork 21 terminating with bearings 22 for a free horizontal roller 23. A roller 24 is similarly carried under the forward portion 25 of each side member 20, such portion terminating with a downward curve and side wings 26 straddling the related track.

Fig. 1 shows the carriage at the origin of its travel, the base pieces 16 forming a rear limit or rest for the rollers 23 with the carriage rearwardly tilted somewhat above the level of the curves 17. Now the steel bar 10 may be drawn with hand hooks from the full-line position in Fig. 2 to mount the carriage, as indicated by the dotted lines in Figs. 1 and 2. Where the bar is long, as the one shown, it will of course span companion carriages. The hooks are now used to pull the bar forward, its weight causing the carriage—or carriages—to travel on the track—or tracks—to the inspection zone. It is now evident that it will be a comparatively easy matter for the men, as they walk along the course of travel, to draw the bar to its destination.

As previously mentioned, a control is provided to automatically limit the progress of the carriage to any desired stopping point or destination. The control referred to originates with braided wire branches 27 leading rearwardly from the carriage to form a cable 28. The latter extends rearwardly and is trained laterally over rollers 29 and 29a carried by a bracket 30 secured on a rear track cross bar 31 to run forwardly as indicated at 32, where the cable is wound on a spool 33 carried by a cross-shaft 34 journaled in the tracks 15. The spool is near the inner side of one track; and the cross-shaft extends through the said track to receive a companion spool 35 on the outside, this spool being wound with a cable 36 which extends toward the rear of the tracks. Here the cable 36 is wound on a ratchet winch 37 controlled by a pawl 38. By setting the winch at points providing desired amounts of slack in the cables 28 and 36, the distance at which the carriage is required to stop can be automatically controlled. This feature enables the first bar in a group to be unloaded at the farthest point along the tracks, the next bar next behind, and so on.

As previously mentioned, means are provided to facilitate the discharge of each bar at the point where the carriage is designed to stop. As noted particularly in Figs. 3 to 5, the carriage plate 19 is formed with a perforation 39 near each of the side members 20, and in each instance extended forwardly with a spring bow 40. The tongue 41 of each bow has a downbend 42 descending through the corresponding perforation 39 to form a bearing 43 for a crank 44 bent forwardly at 45 from lateral and inclined radius arms 46 located under the carriage. The crank 44 and the bends 45 normally lie next underneath the carriage plate 19; and the cable branches 27 connect with the lower ends of the arms 46.

The spring bows 40 are normally positioned as in Figs. 4 and 5, and their positions do not change as long as the carriage is at the origin of its travel or can draw on the cable 28 during travel. When the bows 40 are normally positioned, their downbends 42 form a forward stop for the steel bar load, as indicated by dotted lines in Fig. 2, so that the bar is definitely placed. Now, when the winch 37 is stopped or locked from paying out more cable, the continued motion of the carriage preparatory to stopping causes the cable and its branches 27 to draw on the radius arms 46. The bends 45 now form pivots against the under side of the carriage plate 19 for the downswing of the crank 44, so that the latter is deflected and the bow bearings 43, down bends 42 and tongues 41 are pulled down, as indicated by dotted lines in Fig. 5. The frontal stop for the work is thus removed, so that the same may be pulled onto the tracks at the inspection zone for hoisting by a crane into a flat car or truck.

Figure 2:
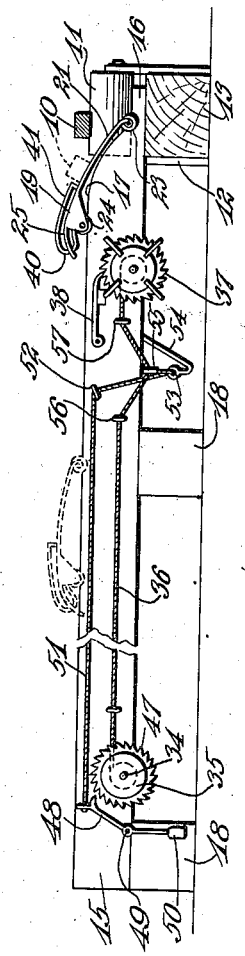
Fig. 2 is a side elevation, partly broken away.

In order to relieve the strain on the cables as the carriage comes to a stop an automatic check for the spools 33 and 35 is provided. This is in the form of a ratchet 47 carried by the spool, with a pawl 48 pivoted at 49 and weighted at 50 against engagement with the ratchet, as shown in Fig. 2. A cord 51 extends from the pawl 48 rearwardly to descend through an eye 52 to an eye 53 below the cable 36 carried by a track bracket 54. The cord is trained through the eye 53 with an upward return to terminate with a ring 55. The latter is hung on the cable 36 and when the same is slack keeps a sag therein between guiding eyes 56 and 57. As long as the carriage is at the point of origin or travels with slack in the cables, no change occurs in the mechanism just described. However, when the carriage is about to stop and draws the cables taut, the sag of cable 36 between the guides 56 and 57 rises to a level, drawing the cord 51. This causes the latter to pull on the pawl 48, so that the same engages the ratchet 47 and stops the rotation of the spools.

It is noted that the carriage plate 19 has a lateral series of perforations 58 under each side member 20. These are tapped and permit screws 59 securing the side members to be driven into chosen perforations for changing the lateral spacing of the side members according to that of the tracks.

It will be evident from the above description that I have provided an apparatus for the designated purpose which materially aids and expedites the transfer of the work, greatly reducing the manual effort and personnel required to move the work. Further, the apparatus eliminates the necessity of using oil or any other lubricant to facilitate the travel of the bars, so that the area surrounding the same is clean and the working environment convenient and conducive to rapid progress and general efficiency. Finally, the apparatus is of a simple character and can be attended by unskilled labor and on an economical basis.

While I have described the invention along specific lines, various minor changes or refinements may be made therein without departing from its principle, and I desire to consider such changes and refinements as coming within the scope and spirit of the appended claims.

I claim:

1. A conveying apparatus for bars issuing from a steel mill comprising a runway, a series of rollers freely journaled along the runway and ridden by each bar to advance the same over the runway, a pair of tracks extending laterally of the runway and entering the same with inclined terminal portions, and a carriage initially inclinedly positioned on said terminal portions and adapted to be drawn by propulsion means from said terminal portions to ride on said tracks, the carriage having rear and frontal rollers to ride the tracks, and base extensions of said terminal portions on said runway forming stops for the rear rollers and contributing to the support of the carriage when it is in the inclined position.

2. A conveying apparatus comprising a pair of tracks extending from a point of origin to one of destination, a carriage positioned to be drawn on the tracks by propulsion means from the point of origin toward that of destination, a cable leading from the center of the carriage to the point of origin and trained laterally to extend in a returning direction along the inner side of one of the tracks to the point of destination, a spool at the latter point receiving the cable, the latter having a predetermined amount of slack when the carriage is at the point of origin, and means for controlling the winding action of the spool to establish only so much slack in the cable as will permit the carriage to proceed a desired distance toward said destination.

3. A conveying apparatus comprising a pair of tracks extending from a point of origin to one of destination, a carriage positioned to be drawn on the tracks by propulsion means from the point of origin toward that of destination, a cable leading from the center of the carriage to the point of origin and trained laterally to extend in a returning direction along the inner side of one of the tracks to the point of destination, a transverse shaft at the latter point and carrying one spool on said inner side and another spool on the outer side of the same track, said cable being wound on the inner spool, a second cable wound on the outer spool and leading along the outer side of said same track to a position proximate to said point of origin, and a ratchet winch receiving the second cable at said position.

4. The structure of claim 3, characterized by the travel of the carriage from the point of origin drawing on the cables to render the outer one taut when the carriage has progressed a desired distance and the winch is set in a locked position, and means controlled by the taut condition of said second cable to check the rotation of said spools.

5. The structure of claim 3, characterized by the travel of the carriage from the point of origin drawing on the cables to render the outer one taut when the carriage has progressed a desired distance and the winch is set in a locked position, and means controlled by the taut condition of said second cable to check the rotation of said spools, said means comprising a toothed wheel carried by the spool shaft, a detent normally free of the toothed wheel, and a connection from the detent to the second cable and loose when the latter is slack, the change of the second cable to taut position drawing on said connection to apply the detent to the toothed wheel.

6. The structure of claim 3, characterized by the travel of the carriage from the point of origin drawing on the cables to render the outer one taut when the carriage has progressed a desired distance and the winch is set in a locked position, and means controlled by the taut condition of said second cable to check the rotation of said spools, said means comprising a toothed wheel carried by the spool shaft, a detent weighted to be normally free of the toothed wheel, and a connection from the detent to the second cable and loose when the latter is slack, the change of the second cable to taut position drawing on said connection to apply the detent to the toothed wheel.

7. The structure of claim 3, characterized by the travel of the carriage from the point of origin drawing on the cables to render the outer one taut when the carriage has progressed a desired distance and the winch is set in a locked position, and means controlled by the taut condition of said second cable to check the rotation of said spools, said means comprising a toothed wheel carried by the spool shaft, a detent normally free of the toothed wheel, a pair of guides for a portion of the second cable, the latter being slack while the carriage is at the point of origin or on its way to the point of destination and becoming taut on reaching the latter, attaching means looped on said portion and defining a sag in the cable between said guides, and a connection from the detent to said attaching means, the pull on the latter on the straightening of said sag when the second cable becomes taut drawing on the connection to apply the detent to the toothed wheel.

8. A conveying apparatus comprising a carriage, trailing means yieldable as the carriage is drawn by propulsion means over a given course, a backstop on the carriage for a load mounted thereon, means to check the trailing means and stop the progress of the carriage, and a connection between the trailing means and said backstop to render the same ineffective when the carriage is stopped.

9. A conveying apparatus comprising a carriage, trailing means yieldable as the carriage is drawn by propulsion means over a given course, a backstop on the carriage for a load mounted thereon, means to check the trailing means and stop the progress of the carriage, and a connection between the trailing means and said backstop to lower the same out of the removing path of the load.

10. The structure of claim 8, the backstop being yieldable in a downward direction.

11. The structure of claim 8, the carriage being extended with a spring bow to locate the backstop in a surmounting position.

12. The structure of claim 8, the carriage being extended with a spring bow to locate the backstop in a surmounting position, and said connection being a lever pivotable by the pull of said trailing means to draw the backstop down on the carriage.

LOVE WINSTON.